United States Patent [19]

Chirichigno

[11] 4,215,470
[45] Aug. 5, 1980

[54] CABLE COVER SLITTING TOOL

[76] Inventor: Jerry Chirichigno, 1306 S. Jay St., Lakewood, Colo. 80215

[21] Appl. No.: 9,763

[22] Filed: Feb. 6, 1979

[51] Int. Cl.² ............................................. B21F 13/00
[52] U.S. Cl. ........................................ 30/90.8; 30/335
[58] Field of Search ...................... 30/90.1, 90.4, 90.8, 30/335

[56] References Cited

U.S. PATENT DOCUMENTS

| 2,943,391 | 7/1960 | Shannon | 30/90.8 |
| 3,238,618 | 3/1966 | Cook | 30/90.4 |
| 3,686,753 | 8/1972 | Baeslack | 30/90.8 |
| 3,750,281 | 8/1973 | Belling | 30/90.8 |
| 4,081,903 | 4/1978 | Cormier | 30/90.8 |

*Primary Examiner*—Jimmy C. Peters
*Attorney, Agent, or Firm*—Richard D. Law

[57] ABSTRACT

A short tubular passage accommodating an electric cable, a slitter blade positioned in a portion of the passage, a cable release guide from the passage and a pistol grip handle secured to the release guide.

6 Claims, 6 Drawing Figures

CABLE COVER SLITTING TOOL

This invention relates to a cutter for slitting the covering on an electric cable exposing the conducting wires prepatory to connecting the wires to terminals.

Electrically conducting wires are normally covering with an insulating cover, and a number of individual covered wires, usually with some spacing material, are formed into a cable and covered with an outer covering. Such cables are formed in very long strands which are rolled on reels for shipments. A particular use of the cable may use only a short portion of the cable on a reel, providing a cable having two ends covered and insulated to the end cut. For many electric connections with a terminal, the conducting wires must be bared. This involves slitting the outer covering, and then slitting the covering on the individual wires. The outer covering is tough and sturdy and difficult to slit, while the wire coverings are easier to cut. Electricians may have to "peel" the ends of a cable many times in a day, and a pocket knife, commonly used, is tedious and not entirely satisfactory. This is particularly true with a protruding end of the cable which has been treaded through a junction or terminal box. The protruding cable covering is usually slit to the box wall so as to free the wires inside the box. The cable covering requires a long slit to seal it for exposing relatively long lengths of wire. The wire covering is peeled only enough to make a connection.

THE INVENTION

The present invention provides a tubular device for accepting an electric cable telescoped therein, with a knife adjacent the inlet to the device in position to slit the cover of the telescoped cable adjacent the inlet. The device includes a cable release surface which forces the cable end upwardly after passing through the cutter section, and a manipulating handle for tilting the unit and pulling the slitting knife along the cable. The unit is preferably made as a one piece molded plastic tool which is inexpensive enough to be a throw away item.

OBJECTS AND ADVANTAGES OF THE INVENTION

Included among the objects and advantages of the invention, is to provide an inexpensive, throw away slitting tool for electric cables.

Another object of the invention is to provide a simple, easily used slitting tool for slitting of the covering of an electric cable.

Still another object of the invention is to provide one piece molded slitting knife holder for slitting the cover of an electric cable.

These and other objects and advantages of the invention may be ascertained by reference to the following description and appended drawings.

GENERAL DESCRIPTION OF THE DRAWINGS

DETAILED DESCRIPTION OF THE DRAWINGS

Figure 1:
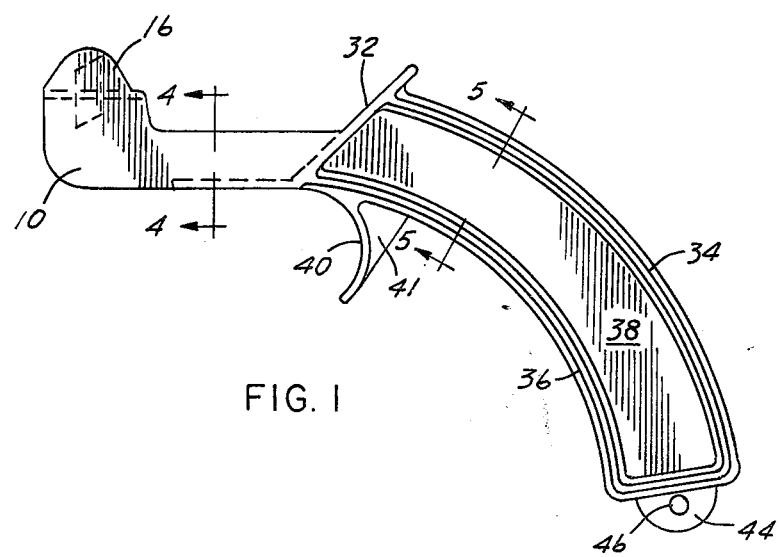
FIG. 1 is a side elevational view of an electric cable splitter tool according to the invention.
Figure 2:
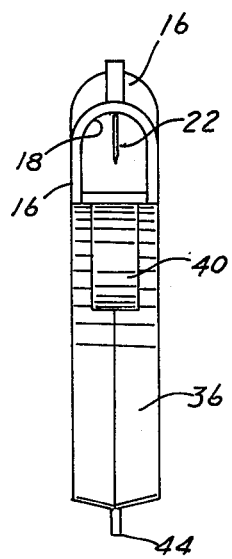
FIG. 2 is a front elevational view of the device of FIG. 1.
Figure 3:
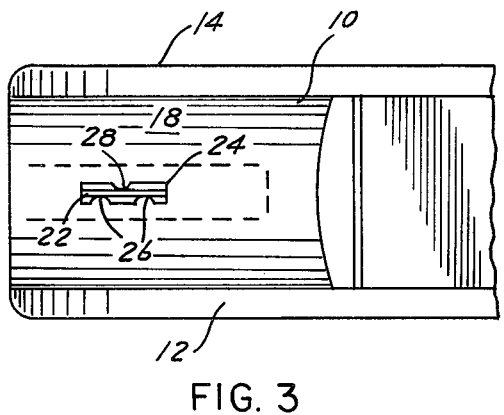
FIG. 3 is a detailed bottom view of the splitter end of the tool of the invention.
Figure 4:
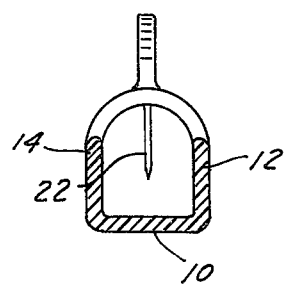
FIG. 4 is a detailed cross-sectional view of the cable guiding passage of the device of FIG. 1 taken on section line 4—4.
Figure 5:
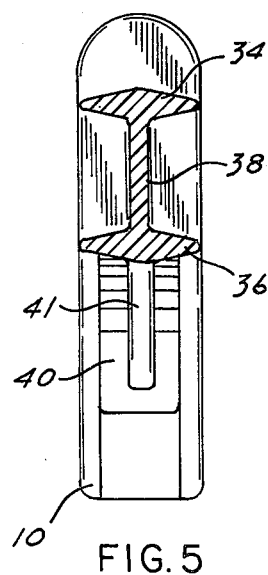
FIG. 5 is a detailed cross-section of the handle section of the tool of FIG. 1 taken on section line 5—5.

The tool of FIG. 1 includes a knife holder section, a cable guiding and release section, and a handle section. The knife holder section includes an inverted U body 10, having side walls 12 and 14, and an arcuate or vaulted top wall 16. The top wall has an arcuate lower surface 18, and an arched upper surface 20, FIG. 6, with a pointed knife blade 22 secured in an opening 24. The knife opening has a pair of spaced projections 26 on one side (FIG. 3) and a projection 28 on the other side centered on the two projections 26. The opening and the projections are formed in the molded part so that a knife blade must be forced between the projections, which tightly secure the blade in the tool. The knife blade may be made with two points and two cutting edges so that it is reversable, and may be changed using long nose pliers, for example. The sharp edge 23 should face the bottom of the cable inlet so as to be in position to cut the covering of the cable as the tool is withdrawn from a telescoped cable. The width between the side walls, and of course their height, determines the maximum size of the cable. For most home type electrical work, the slitter should handle a cable made of 3 No. 8 wires. Smaller cables may be passed through the slitter for slitting their covers.

Figure 6:
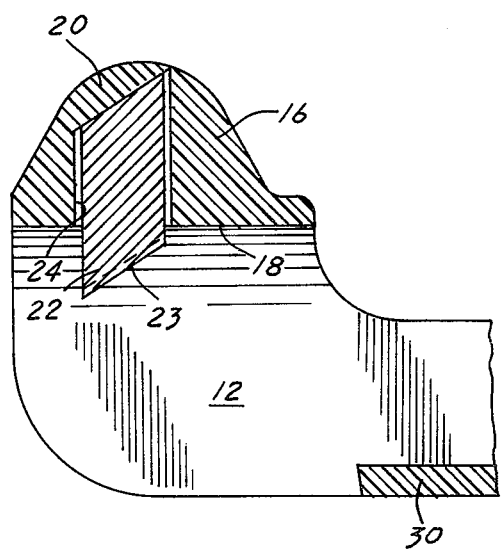
FIG. 6 is an enlarged detailed cross-sectional view of the knife holding section of the tool according to the invention.

The cable guide section is integrally formed with the slitting section, and it includes extensions of the side walls 12 and 14, and a connecting bottom 30, FIG. 6. The bottom wall 30 extends generally planar along the length of the guide section and then angles upwardly forming wall section 32 extending above the side walls. A cable entering the tool moves along the bottom wall 30 then moves up the angles wall 32, either by bending the cable or tilting the tool. The tool is tilted to force the blade into the cable covering as the tool is withdrawn from the cable.

The handle section is integral with the guide section including a pair of curved flanges 34 and 36, which are integral with a web 38. A trigger shaped finger rest 40, having a reinforcing web 41, depends downwardly from the handle near its upper end. An extending flange 44 with an aperture 46 provides means for attaching a chain or cord to the tool, for hanging it from the worker's clothing in position for fast retrival.

The tool is effectively injection molded as a single unit, including the three sections as an integral tool. It may be molded of an inexpensive plastic or polymer when then manufactured, as by injection molding, it is an inexpensive item and it may be a thrown away when the knife dulls. Such polymers as ABS, acrylics, nylon, phenolics, polyesters, etc. may be used in an injection molding manufacturing. The molding produces the integral plastic portions of the tool, with the knife being inserted after the withdrawal of the plastic tool from the mold. The knife blade is inexpensive so the total tool is a highly usable, inexpensive tool.

The tool is used by telescoping it over an electric cable, passing it on to the cable from the knife section, so the cable passes rearwardly into the guide and release section. The cable end passes up the surface 23 out the tool. The cable covering is slit by tilting the tool to force the knife into the top of cable covering, with the top of surface 23 impinging on the bottom of the cable. The tool is withdrawn from the cable while tilted, to slit the cable cover. For protruding cable ends, the tool may be passed over the cable up to the wall from which the cable protrudes. This permits slitting the cover up to a fraction of an inch from the wall. The slit cover is now ready to be cut off and the ends of the wires bared for connection with terminals.

What is claimed is:

1. An electric cable cover slitter tool comprising,
   (a) a pair of spaced apart walls,
   (b) a short top wall, of substantially less than the length of said pair of spaced apart walls, joining said spaced apart walls at the front portion thereof,
   (c) a bottom wall joining said spaced apart walls from a point adjacent to and spaced rearwardly from said short top wall leaving an opening for cables and terminating in a wall section angled from the plane of said bottom wall forming a cable release,
   (d) handle means depending from said pair of spaced apart walls, and
   (e) knife means secured in said short top wall in position to slit a cable covering passing between said spaced apart wall.

2. An electric cable cover slitter tool according to claim 1, wherein said spaced apart walls, top wall, bottom wall and handle means are integral and formed as a single unit.

3. An electric cable cover slitter tool according to claim 1, wherein said short top wall is vaulted.

4. An electric cable cover slitter tool according to claim 1, wherein said wall section angled from the plane of said bottom wall extends above said pair of spaced apart side walls.

5. An electric cable cover slitter tool according to claim 1, wherein said handle means includes finger rest means.

6. An electric cable cover slitter tool according to claim 1, wherein a knife holding elongated recess is formed in said short top wall, including a pair of spaced apart projections on one wall of said recess and a single projection on the other wall of said recess centered between said pair of projections for securing a thin blade knife therein.

* * * * *